(12) United States Patent
Asahina et al.

(10) Patent No.: US 8,182,934 B2
(45) Date of Patent: May 22, 2012

(54) SECONDARY BATTERY

(75) Inventors: Takashi Asahina, Toyohashi (JP); Shinji Hamada, Toyohashi (JP); Toyohiko Eto, Toyota (JP)

(73) Assignee: Panasonic EV Energy Co., Ltd., Shizuoka (JP)

( * ) Notice: Subject to any disclaimer, the term of this patent is extended or adjusted under 35 U.S.C. 154(b) by 763 days.

(21) Appl. No.: 12/314,145

(22) Filed: Dec. 4, 2008

(65) Prior Publication Data
US 2009/0155672 A1     Jun. 18, 2009

(30) Foreign Application Priority Data
Dec. 18, 2007  (JP) .................................. 2007-326206

(51) Int. Cl.
*H01M 2/12* (2006.01)
(52) U.S. Cl. .............................. 429/54; 429/53; 429/163

(58) Field of Classification Search .................. None
See application file for complete search history.

(56) References Cited

U.S. PATENT DOCUMENTS
2008/0020268 A1 *  1/2008  Hamada et al. .................. 429/56

FOREIGN PATENT DOCUMENTS
WO    WO 2006/004143 A1    1/2006

* cited by examiner

*Primary Examiner* — Cynthia Lee
(74) *Attorney, Agent, or Firm* — Oliff & Berridge, PLC

(57) ABSTRACT

A secondary battery comprises a power generating element, a battery case including a gas release hole, and a valve safety device configured to close the gas release hole and release gas out of the battery case when inner pressure in the battery case exceeds a predetermined value. The safety valve device comprises a valve member and a holding member. The valve member includes a sealing portion hermetically making contact with a sealed surface around the gas release hole, and the holding member is fixed to the battery case to elastically press the sealing portion by its elastic deformation.

12 Claims, 4 Drawing Sheets

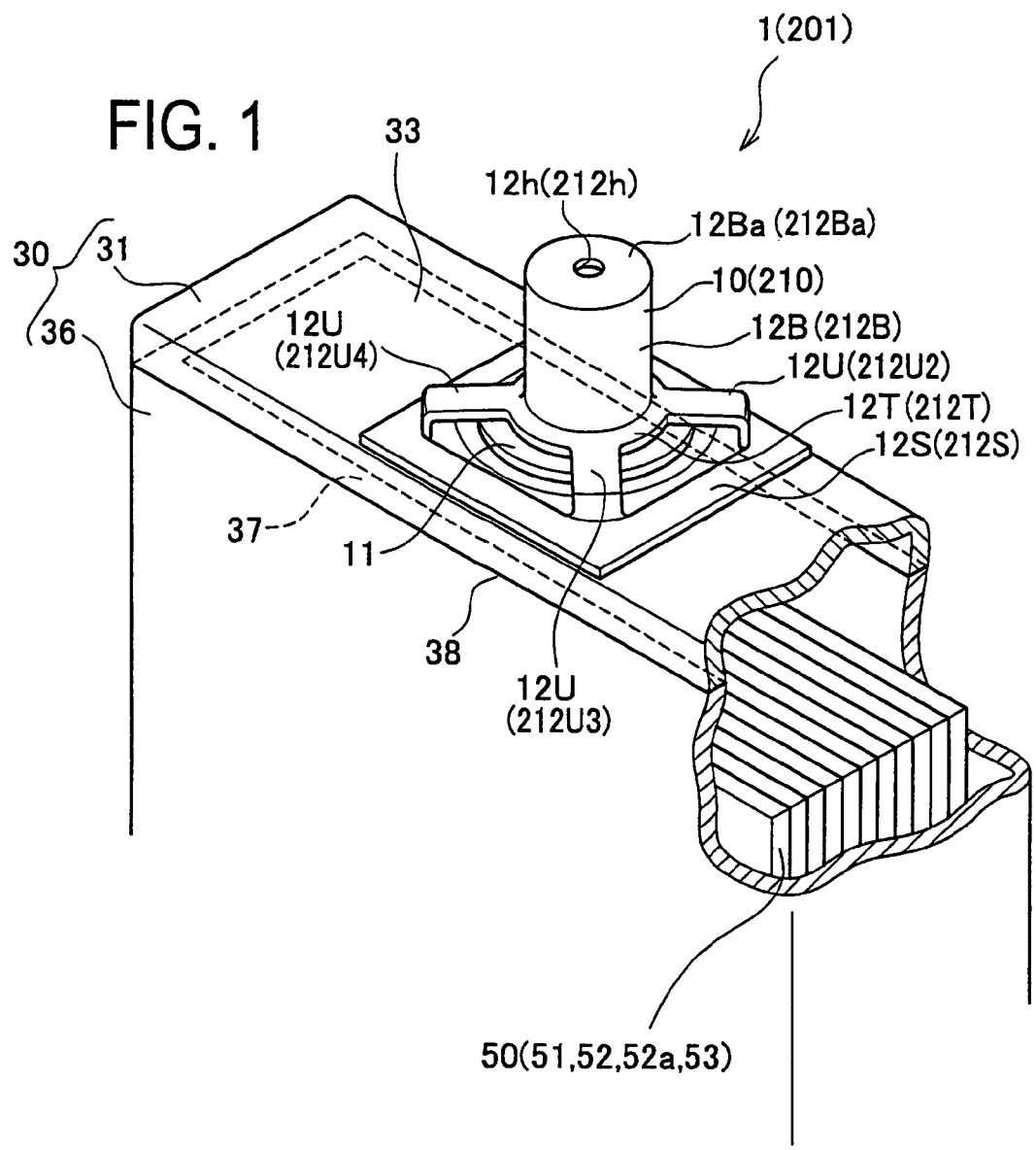

SECONDARY BATTERY

CROSS-REFERENCE TO RELATED APPLICATIONS

This application is based upon and claims the benefit of priority from each of the prior Japanese Patent Application No. 2007-326206 filed on Dec. 18, 2007, the entire contents of which are incorporated herein by reference.

BACKGROUND OF THE INVENTION

1. Field of the Invention

The present invention relates to a secondary battery provided with a safety valve device.

2. Description of Related Art

In some secondary batteries, a battery case for storing a power generating element is provided with a safety valve (a safety valve device) having an excessive pressure preventing function. Such the safety valve device is provided for preventing an excessive increase of inner pressure in the battery case and preventing a breakage of the battery case by opening the safety valve to safely release gas out of the battery case when the inner pressure in the battery case rises, more specifically, when the inner pressure extremely rises due to a mass amount of gas generated from the power generating element.

Among such secondary batteries, for example, in a nickel-metal hydride secondary battery, inner pressure in a battery case could be increased depending on electric charge and discharge cycle even if the battery performance does not largely decline. In response to this, such the secondary battery is provided with a restorable safety valve device as a safety valve (a safety valve device) that is able to reseal a valve after once opening the valve.

Further, concerning the above mentioned nickel-metal hydride secondary battery, it is disclosed that a safety valve device having a hydrogen leaking function to control fluctuations of discharge reserve and charge reserve in a negative electrode in addition to the excessive pressure preventing function (see FIG. 2 of WO2006/004143).

However, the restorable safety valve device disclosed in FIG. 2 of WO2006/004143 requires a spring member and a holding member besides a valve member, resulting in a complicated structure.

BRIEF SUMMARY OF THE INVENTION

The present invention has been made in view of the above circumstances and has an object to provide a secondary battery provided with a safety valve device having the above mentioned excessive pressure preventing function, hence the safety valve device having a simple configuration with less number of components.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a secondary battery, comprising: a power generating element; a battery case storing the power generating element and including a gas release hole; and a safety valve device configured to close the gas release hole and release gas out of the battery case through the gas release hole when inner pressure in the battery case exceeds a predetermined value, wherein the safety valve device comprises: a valve member closing the gas release hole; and a holding member holding the valve member on the battery case, the valve member includes a sealing portion separably making contact with a sealed surface located around the gas release hole of an outer surface of the battery case, and the holding member is fixed to the battery case and elastically presses the sealing portion by its elastic deformation.

In the secondary battery of the present invention, the safety valve device is formed with the valve member including the sealing portion and the holding member to hold the valve member. Further, the holding member is fixed to the battery case and elastically presses the sealing portion by its elastic deformation. Therefore, an additional spring member is not required separately, so that compared to the safety valve device shown in WO2006/004143, a secondary battery having a safety valve device with less number of components can be provided.

In addition, the secondary battery has only to be provided with a safety valve device. Preferably, it is a secondary battery requiring a restorable safety valve device which can efficiently function every time the inner pressure declines after once opening a valve. For example, a nickel-metal hydride secondary battery is preferable.

The sealed surface of the battery case may include, for example, an annular outer surface around a gas release or vent hole in a case body. Alternatively, the sealed surface may be an annular outer surface of another member which is annularly disposed around the gas release hole.

The holding member is fixed to the battery case and configured to elastically press the sealing portion. For example, the holding member may be integrally formed of a metal plate or a metal chip by pressing, bending, or another forming technique.

BRIEF DESCRIPTION OF THE DRAWINGS

The accompanying drawings, which are incorporated in and constitute a part of this specification illustrate an embodiment of the invention, and together with the description, serve to explain the objects, advantages, and principles of the invention.

In the drawings,

FIG. 1 is a partially broken perspective view of a secondary battery according to first and second embodiments of the present invention;

DETAILED DESCRIPTION OF THE PREFERRED EMBODIMENTS

Figure 2A:
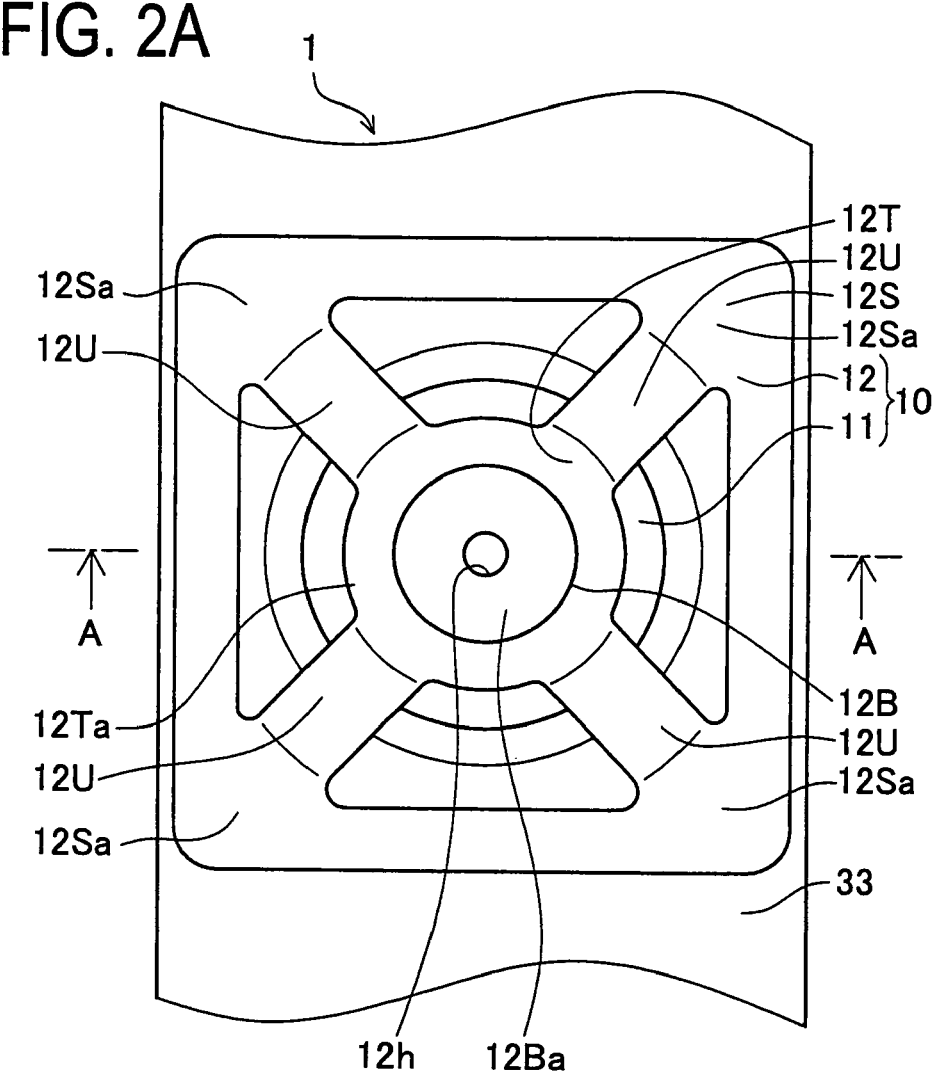
FIG. 2A is a partially enlarged top view showing a safety valve device and its vicinity of the secondary battery according to the first embodiment.

A detailed description of preferred embodiments of a secondary battery embodying the present invention will now be given referring to the accompanying drawings.

First Embodiment

As shown in FIG. 1, a secondary battery 1 of a first embodiment is a rectangular parallelepiped sealed nickel-metal hydride secondary battery provided with a safety valve device 10, a battery case 30 including a cover plate 31 and a case body 36, an electrode plate group (power generating element) 50 installed in the battery case 30, and a not-shown electrolyte.

The electrode plate group 50 comprises positive electrodes 51, negative electrodes 52, and bag-shaped separators 53. The positive electrodes 51 are inserted individually into the bag-shaped separators 53, and the positive electrodes 51 and the negative electrodes 52 are alternately laminated to form the electrode plate group 50. The positive electrodes 51 and the negative electrodes 52 are respectively collected and connected to a not-shown positive terminal and a not-shown negative terminal.

In addition, as the positive electrodes 51, an electrode plate formed with an active material support such as foamed nickel which bears an active material including nickel hydroxide may be adopted, for example. On the other hand, as the negative electrodes 52, an electrode plate including a hydrogen absorbing alloy serving as a negative electrode active material 52a may be adopted, for example. As the separators 53, a non-woven fabric made of hydrophilized synthetic fiber may be adopted. Further, as the electrolyte (not-shown), an alkaline solution containing KOH with a specific gravity of 1.2 to 1.4 may be adopted.

The case body 36 is made of a nickel-plated steel plate having a rectangular box shape with one opening side surface. The cover plate 31 is also made of a nickel-plated steel plate having a nearly rectangular plate shape. The cover plate 31 is formed with a gas release hole 32 communicating the inside and the outside of the battery case 30 (see FIG. 2B). Moreover, the cover plate 31 is placed on and welded over its entire circumference to an open end face 37 of the case body 36 and thereby an opening 38 of the case body 36 is hermetically closed. In this way, the cover plate 31 and the case body 36 are integrated to constitute the battery case 30.

Figure 2B:
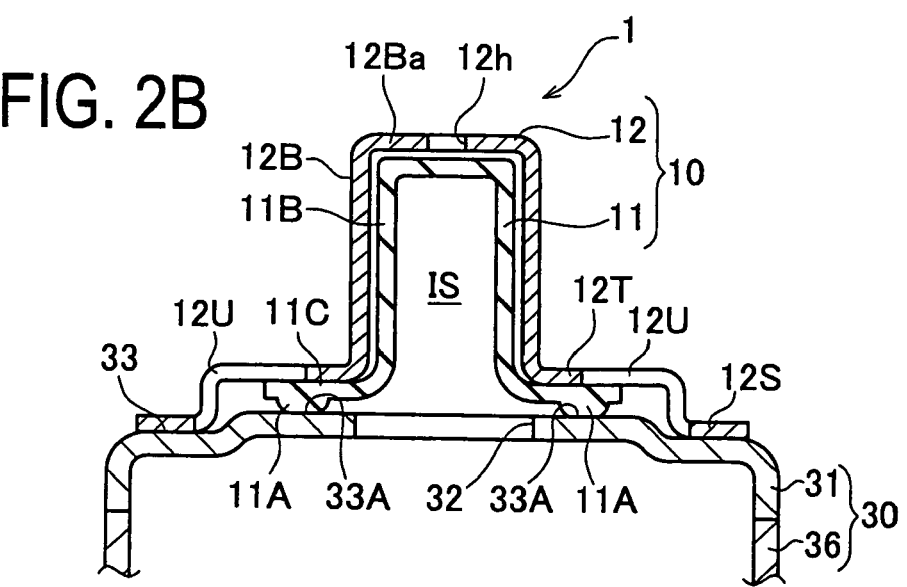
FIG. 2B is a partially enlarged sectional view showing the safety valve device and its vicinity of the secondary battery taken along a line A-A in FIG. 2A.

The safety valve device 10 includes a valve member 11 and a holding member 12 (see FIGS. 2A and 2B). The valve member 11 having a bottomed cylindrical shape formed with a hat-like flange is made of a rubber material (specifically, EPDM) which allows hydrogen gas to permeate or pass therethrough. More precisely, the valve member 11 includes a wall portion 11B having a bottomed cylindrical shape and a flange 11C that is located in an opening side of the wall portion 11B and extends radially outwardly from the wall portion 11B. The flange 11C is formed with a sealing portion 11A shaped as an annular ridge line. The valve member 11 is disposed so as to close the gas release hole 32. Specifically, the sealing portion 11A formed in the flange 11C of the valve member 11 is airtightly but separably in close contact with a sealed surface 33A annularly positioned around the gas release hole 32 of an outer surface 33 of the cover plate 31. Thereby, in the valve member 11, the bottomed cylindrical wall portion 11B defines valve inner space IS communicating with the inside of the battery case 30 through the gas release hole 32.

The holding member 12 is made of a single nickel-plated steel plate in an integral form by pressing. The holding member 12 includes a surrounding portion 12B having a nearly bottomed cylindrical shape and surrounding the wall portion 11B of the valve member 11, a fixing portion 12S having a rectangular frame-like shape fixed to the outer surface 33 of the cover plate 31 (the battery case 30) by welding, and a pressing portion 12T radially outwardly extending like a flange from the surrounding portion 12B to elastically press the sealing portion 11A of the valve member 11 toward the sealed surface 33A. Further, the holding member 12 is formed with four leg portions 12U. The leg portions 12U each have a band shape radially extending from peripheral edge portion 12Ta of the pressing portion 12T to four corners 12Sa of the fixing portion 12S. Each of the leg portions 12U is bent like a crank and interposed between the fixing portion 12S and the pressing portion 12T. In addition, a vent hole 12h is formed in an upper portion 12Ba of the surrounding portion 12B. In the present embodiment, all the four leg portions 12U are identical in shape, having the same spring property, and they are similarly elastically deformed. Consequently, the pressing portion 12T is equally pressed with equal elastic force by each of the leg portions 12U. Thereby, usually, the sealing portion 11A is airtightly placed in close contact with the sealed surface 33A to close the gas release hole 32, so that gas or the like can be prevented from being released out of (discharged from) the battery case 30.

In the safety valve device 10, when gas such as hydrogen gas is generated from the electrode plate group 50 in the battery case 30, and the inner pressure in the battery case 30 exceeds a predetermined value, the sealing portion 11A is lifted up against the pressing force of the pressing portion 12T, and accordingly, the sealing portion 11A is separated from the sealed surface 33A. In this way, the gas inside the battery case 30 can be released outside through the gas release hole 32. Thereby, in the secondary battery 1, the gas inside the battery case 30 can be released outside through the gas release hole 32 and the sealing portion 11A which is separated from the sealed surface 33A. Additionally, when the inner pressure declines, the sealing portion 11A is pressed in contact with the sealed surface 33A again, thus closing the gas release hole 32 again. As a result, for example, the secondary battery 1 can comprise the safety valve device 10 having a simpler structure with less number of components compared to the safety valve device of WO2006/004143.

The valve member 11 of the safety valve device 10 is made of rubber (EPDM). Moreover, the wall portion 11B of the valve member 11 has a bottomed cylindrical shape to create the valve inner space IS, so that the wall portion 11B has a large contact area (permeating area) which will be exposed to hydrogen gas generated in the battery case 30. Accordingly, the hydrogen gas generated in the battery case 30 is allowed to gradually permeate or pass through the wall portion 11B of the valve member 11, and leak out of the secondary battery 1 through the vent hole 12h of the holding member 12. In other words, the safety valve device 10 has a hydrogen leaking function for releasing the hydrogen gas generated in the battery case 30 out of the secondary battery 1 as well as the excessive pressure preventing function for preventing excessive increase of the internal pressure in the battery case 30.

Especially, in the secondary battery 1 of the present embodiment, the holding member 12 is integrally formed by pressing. Specifically, the surrounding portion 12B, the pressing portion 12T, the fixing portion 12S, and the leg portions 12U are integrally configured as the holding member 12. Consequently, compared to the safety valve device requiring a spring member as shown in FIG. 2 of WO2006/004143, the secondary battery 1 provided with the safety valve device 10 having a simpler structure with less components can be attained.

In addition, in the secondary battery 1 of the present embodiment, the pressing portion 12T is pressed by the four leg portions 12U, so that the pressing force of the sealing portion 11A can be easily adjusted.

Moreover, in the secondary battery 1, the valve member 11 includes the wall portion 11B which allows hydrogen gas to permeate or pass therethrough. Therefore, the secondary battery 1 can be provided with the safety valve device 10 having a simple structure and further having the hydrogen leaking function for gradually releasing hydrogen gas from the battery case 30 therethrough.

Each leg portion 12U of the present embodiment serves as an elastically deformable portion, the wall portion 11B serves as a space wall portion, the outer surface 33 serves as a case outer surface, the electrode plate group 50 serves as a power generating element, and the negative electrode active material 52a serves as an active material, respectively.

Modified Embodiment

Figure 3A:
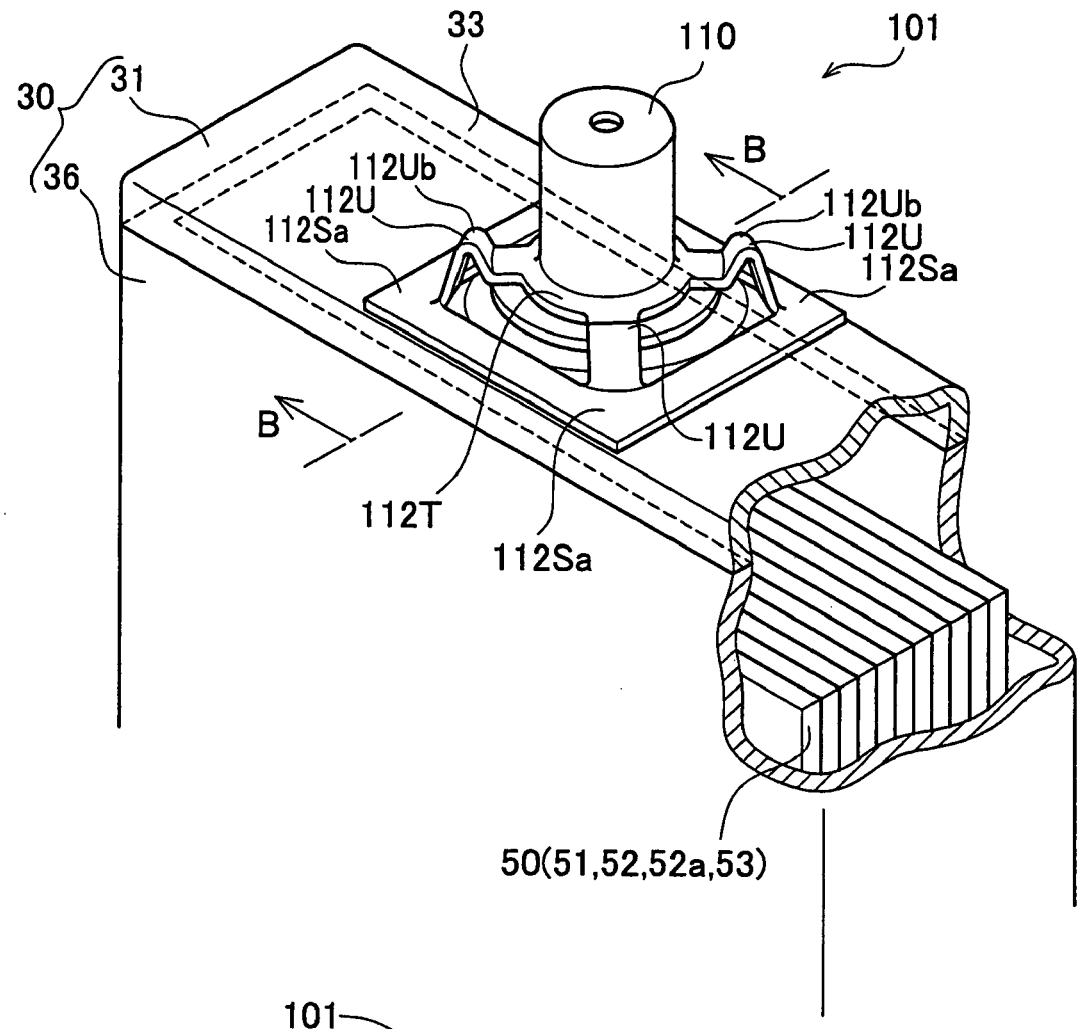
FIG. 3A is a partially broken perspective view of a secondary battery according to a modified embodiment.
Figure 3B:
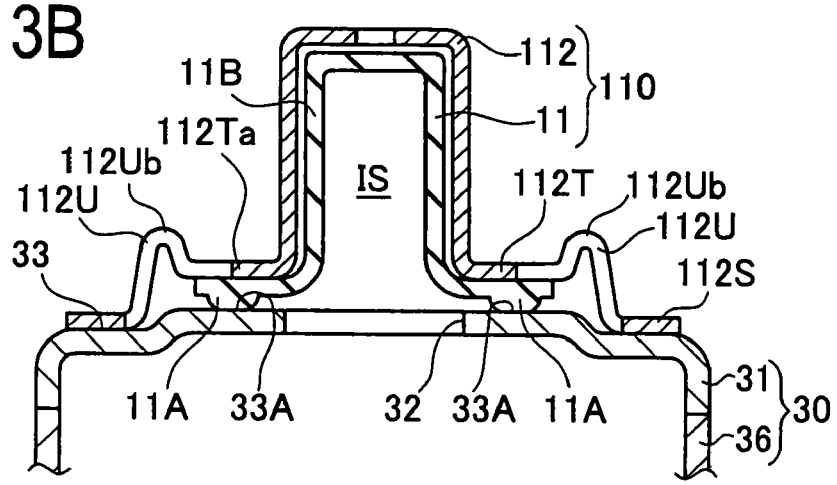
FIG. 3B is a partially enlarged sectional view showing a safety valve device of the secondary battery taken along a line B-B in FIG. 3A.

A modified embodiment of the present invention will now be explained referring to FIGS. 3A and 3B.

A secondary battery of the modified embodiment has the same configuration with that of the first embodiment except the shape of each leg portion of a holding member.

Therefore, the following explanation is focused on features different from the first embodiment, and explanation of the same configuration as those of the first embodiment is omitted or simplified. The same configuration has the same operations and advantages with those of the first embodiment. Further, the same parts or components as those of the first embodiment are assigned the same reference codes.

In a secondary battery 101 in the modified embodiment, a safety valve device 110 is also provided in the battery case 30. However, in the safety valve device 110, a holding member 112 to hold the valve member 11 has leg portions 112U different in shape from the leg portions 12U of the first embodiment. Specifically, each of the four leg portions 112U has a similar band shape to those of the first embodiment, but it has a curved portion 112Ub having a nearly U-shape which protrudes upward, connecting between a corner 112Sa of a fixing portion 112S and a peripheral edge portion 112Ta of a pressing portion 112T. Because of the presence of the curved portions 112Ub, the leg portions 112U have less elastic constant and are easily elastically deformable compared to the leg portions 12U of the first embodiment. Accordingly, the sealing portion 11A is more easily separated from the sealed surface 33A than in the first embodiment, so that the valve-opening pressure can be lowered.

Second Embodiment

Second embodiment of the present invention will now be explained referring to FIGS. 1 and 4A to 4C.

A secondary battery of the second embodiment is identical to that of the first embodiment except that one of four leg portions of a holding member of a safety valve device is different in shape from other three leg portions.

Accordingly, the following explanation is focused on features different from the first embodiment, and explanation of the same configuration as those of the first embodiment is omitted or simplified. The same configuration has the same operations and advantages with those of the first embodiment. Further, the same parts or components as those of the first embodiment are assigned the same reference codes.

A secondary battery 201 of the second embodiment is, as same as the secondary battery 1 of the first embodiment, a rectangular parallelepiped sealed nickel-metal hydride secondary battery provided with a safety valve device 210, a battery case 30, an electrode plate group 50, and a not-shown electrolyte (see FIG. 1).

Figure 4A:
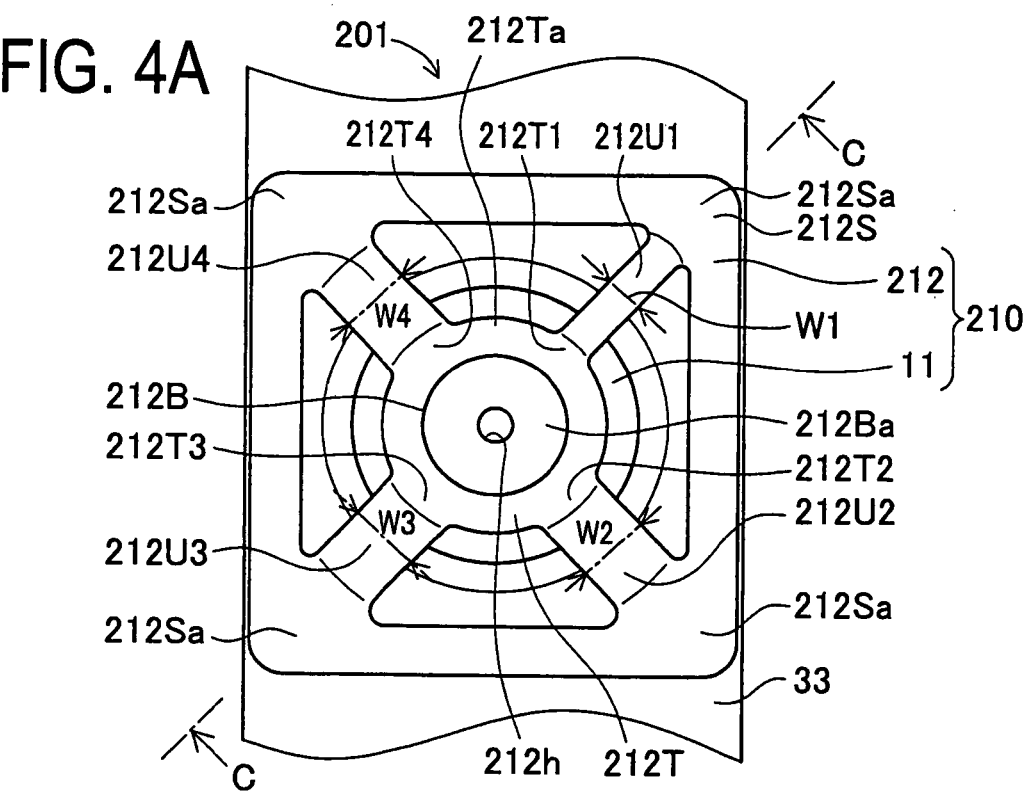
FIG. 4A is a partially enlarged top view showing a safety valve device and its vicinity of a secondary battery according to the second embodiment.
Figure 4B:
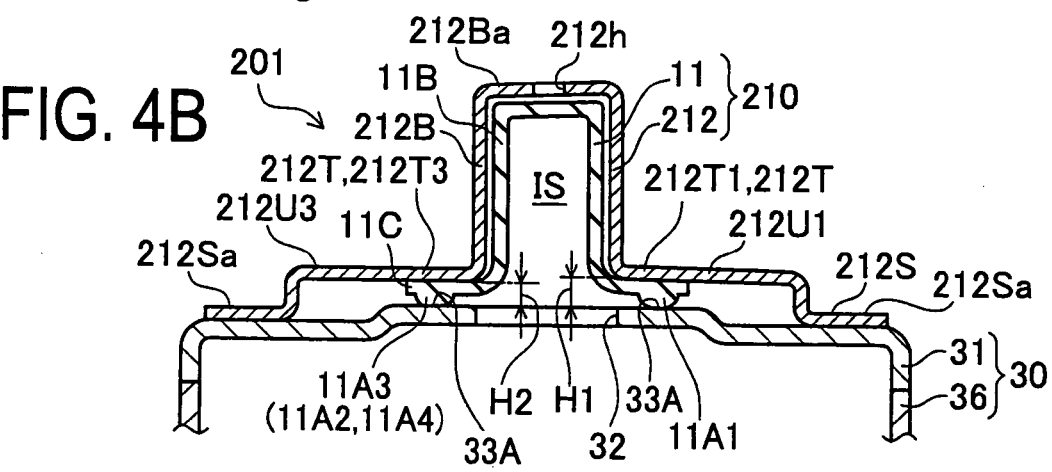
FIG. 4B is a partially enlarged sectional view showing the safety valve device and its vicinity of the secondary battery taken along a line C-C in FIG. 4A.
Figure 4C:
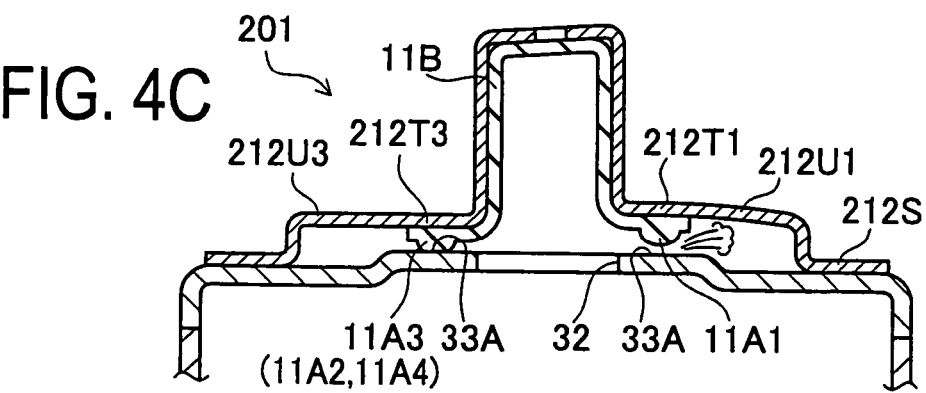
FIG. 4C is a partially enlarged sectional view showing the safety valve device of the secondary battery at a time of inner pressure rising.

The safety valve device 210 includes the valve member 11 similar to that of the first embodiment and a holding member 212 to hold the valve member 11 (see FIG. 4B).

The holding member 212 is made of a single nickel-plated steel in an integral form by pressing. The holding member 212 includes a surrounding portion 212B having a nearly bottomed cylindrical shape and surrounding the wall portion 11B of the valve member 11, a fixing portion 212S having a rectangular frame-like shape fixed to the outer surface 33 of the cover plate 31 (the battery case 30) by welding, and a pressing portion 212T radially outwardly extending like a flange from the surrounding portion 212B to elastically press a first sealing portion 11A1 and second sealing portions 11A2, 11A3 and 11A4 among the sealing portion 11A of the valve member 11 toward the sealed surface 33A. Further, the holding member 212 is formed with four leg portions 212U (a first leg portion 212U1 and second leg portions 212U2, 212U3, and 212U4). The leg portions 212U each have a band shape radially extending from peripheral edge portion 212Ta of the pressing portion 212T to four corners 212Sa of the fixing portion 212S. Each of the leg portions 212U is bent like a crank and interposed between the fixing portion 212S and the pressing portion 212T. In addition, a vent hole 212h is formed at an upper portion 212Ba of the surrounding portion 212B.

The four leg portions 212U are identical in shape except the width. The width W1 of the first leg portion 212U1 is designed to be narrower than the widths W2, W3, and W4 (W2=W3=W4) of the second leg portions 212U2, 212U3, and 212U4 (W1<W2, W3, W4). Therefore, an elastic constant of the first leg portion 212U1 is different from that of the second leg portions 212U2, 212U3, and 212U4. In other words, the first leg portion 212U1 is a low elastic leg portion having a low elastic constant (on the contrary, the second leg portions 212U2, 212U3, and 212U4 are high elastic leg portions having high elasticity).

Further, the pressing portion 212T includes a first pressing portion 212T1 and second pressing portions 212T2, 212T3, and 212T4. The first pressing portion 212T1 is urged by the first leg portion 212U1 to receive an elastic force therefrom. Likewise, the second pressing portions 212T2, 212T3, and 212T4 receive an elastic force from the second leg portions 212U2, 212U3, and 212U4 respectively. As mentioned above, the holding member 212 is integrally constituted of the fixing portion 212S having a rectangular frame-like shape, the pressing portion 212T, and the leg portions 212U. In other words, four corners 212Sa of the fixing portion 212S are positioned on a same plane. As explained above, the first leg portion 212U1 is the low elastic leg portion, and the second leg portions 212U2, 212U3, and 212U4 are the high elastic leg portions, so that the pressing force of the first leg portion 212U1 acting on the first pressing portion 212T1 is smaller than the pressing force of the second leg portions 212U2, 212U3, and 212U4 acting on the second pressing portions 212T2, 212T3, and 212T4. Therefore, even if the inner pressure in the battery case 30 is in an initial state, the height H1 of the first pressing portion 212T1 is higher than the height H2 of the second pressing portions 212T2, 212T3, and 212T4 (H1>H2) (see FIG. 4B).

The following explanation is made on the case where gas such as hydrogen gas is generated from the electrode plate group 50 in the battery case 30 and the inner pressure in the battery case 30 exceeds a predetermined value. When the inner pressure rises, the pressing portion 212T (the first pressing portion 212T1 and the second pressing portions 212T2, 212T3, and 212T4) is lifted up. In this situation, since the first leg portion 212U1 urging the first pressing portion 212T1 is the low elastic leg portion, the first leg portion 212U1 is lifted up higher than the second leg portions 212U2, 212U3, and 212U4 serving as the high elastic leg portions even if equal force is applied to all the four leg portions 212U by the equal inner pressure rise. As a result, when the inner pressure rises, the first pressing portion 212T1 is more easily lifted up than the other pressing portions among the pressing portion 212T. Consequently, the first sealing portion 11A1 is separated earlier from the sealed surface 33A than the other sealing portions (second sealing portions 11A2, 11A3, and 11A4, thereby the valve is opened. Thus, gas is released (see FIG. 4C).

Accordingly, in the secondary battery 201 of the second embodiment, when the inner pressure in the battery case 30 exceeds the predetermined value, the first sealing portion 11A1 is separated earlier from the sealed surface 33A than the other sealing portions, i.e. the second sealing portions 11A2, 11A3, and 11A4 among the sealing portion 11A of the valve member 11, thereby placing the valve member 11 (the safety valve device 210) into an open state. Therefore, the valve opening pressure of the first sealing portion 11A1 corresponds to the valve opening pressure of the entire safety valve device 210, so that the amount of the valve opening pressure of the safety valve device 210 can be precisely determined. Further, the valve member 11 (the safety valve device 210) can be certainly opened by the first sealing portion 11A1 of the sealing portion 11A, so that location and direction of gas release can be specified. In the second embodiment, specifically, the gas can be released in the upper right direction in FIG. 4A. Thereby, in order to introduce the gas released from the safety valve device 210 to the outside, a release path or the like can be easily and appropriately designed.

In addition, the secondary battery 201 of the second embodiment is also provided with the four leg portions 212U to press the pressing portion 212T, so that the pressing force of the sealing portion 11A can be easily adjusted. More than that, the pressing force pressing each of the first sealing portion 11A1 and the second sealing portions 11A2, 11A3, and 11A4 can be individually and more easily adjusted.

The secondary battery 201 of the second embodiment comprises the first leg portion 212U1 as the low elastic leg portion and the second leg portions 212U2, 212U3, and 212U4 as the high elastic leg portions. This makes it possible to allow the first sealing portion 11A1 to behave differently from the second sealing portions 11A2, 11A3, and 11A4 at the time the inner pressure rises.

The present invention is not limited to the above embodiments and may be embodied in other specific forms without departing from the essential characteristics thereof.

For example, in the first and subsequent embodiments, four leg portions are provided as elastic deformable portions to urge pressing portions. Alternatively, the leg portions may be more than two, preferably more than three, taking account of the stability.

In the second embodiment, one of the four leg portions is arranged as a low elastic leg portion, and three other leg portions are arranged as high elastic leg portions. Alternatively, a plurality of leg portions may be configured as low elastic leg portions. Further, in the second embodiment, the width W1 of the first leg portion 212U1 is designed to be narrower than the widths W2, W3, and W4 of the other leg portions. Alternatively, the first leg portion may be formed in a shape having a smaller sectional area and thinner thickness. For example, some leg portions may be of the shape as disclosed in the modified embodiment. Moreover, the length of the first leg portion (the length between the pressing portion and the fixing portion) may be longer than the other leg portions.

Furthermore, in the first and subsequent embodiments, the fixing portion of the holding member has a single rectangular frame-like shape to which the four leg portions are connected. Alternatively, a plurality of fixing portions may be provided so as to be individually connected to elastic deformable portions such as the leg portions. Specifically, even in the case where a plurality of elastic deformable portions (a plurality of leg portions and others) are provided, all the elastic deformable portions (leg portions) do not have to be connected to a single fixing portion. One or more elastic deformable portions (leg portions) may be connected to each of the plurality of fixing portions.

SUMMARY OF THE INVENTION

In summary, the present invention relates to a secondary battery comprising: a power generating element; a battery case storing the power generating element and including a gas release hole; and a safety valve device configured to close the gas release hole and release gas out of the battery case through the gas release hole when inner pressure in the battery case exceeds a predetermined value, wherein the safety valve device comprises: a valve member closing the gas release hole; and a holding member holding the valve member on the battery case, the valve member includes a sealing portion separably making contact with a sealed surface located around the gas release hole of an outer surface of the battery case, and the holding member is fixed to the battery case and elastically presses the sealing portion by its elastic deformation.

In the secondary battery of the present invention, the safety valve device is formed with the valve member including the sealing portion and the holding member to hold the valve member. Further, the holding member is fixed to the battery case and elastically presses the sealing portion by its elastic deformation. Therefore, an additional spring member is not required to be installed separately, so that compared to the safety valve device of WO2006/004143, the secondary battery having the safety valve device can be provided with less number of components.

In the above mentioned secondary battery, preferably, the holding member includes: a fixing portion fixed to the outer surface of the battery case; a pressing portion elastically pressing the sealing portion of the valve member toward the sealed surface of the battery case; and an elastic deformable portion being interposed between the fixing portion and the pressing portion and elastically urging the pressing portion toward the sealed surface of the battery case by elastic deformation of the elastic deformable portion itself.

The secondary battery of the present invention is provided with the holding member including the fixing portion, the pressing portion, and the elastic deformable portion.

The pressing portion presses the sealing portion by urging force of the elastic deformable portion. As a result, when the force applied to the sealing portion by the inner pressure rise in the battery case becomes nearly balanced with or greater than the pressing force of the pressing portion, the sealing portion of the valve member is separated from the sealed surface. Thereby, in the secondary battery, gas can be released out of the battery case through the gas release hole and the sealing portion which is separated from the sealed surface. Consequently, for example, compared to the safety valve device of WO2006/004143, the secondary battery having the safety valve device can be provided with less number of components and with simpler structure.

In addition, the elastic deformable portion transmits the elastic force generated by its own elastic deformation to the pressing portion. Thus, the elastic deformable portion indirectly presses the sealed surface via the pressing portion.

In the above mentioned secondary battery, preferably, the sealing portion of the valve member includes: a first sealing portion to be separated from the sealed surface of the battery case when the inner pressure in the battery case exceeds the predetermined value; and a second sealing portion to remain in contact with the sealed surface of the battery case or to be separated from the sealed surface of the battery case later than the first sealing portion when the inner pressure in the battery case exceeds the predetermined value.

When the inner pressure of the secondary battery rises and any part of the annular sealing portion is separated from the sealed surface, the safety valve is opened. In other words, gas is released. However, which part of the sealing portion is separated first is not always fixed. Further, the pressure value (valve opening pressure) at that time is likely to vary.

In response to the above problems, in the secondary battery of the present invention, when the inner pressure in the battery case exceeds a predetermined value, the first sealing portion is separated from the sealed surface earlier than the second sealing portion of the valve member, thus placing the valve member into an open state. The valve opening pressure of the first sealing portion corresponds to the valve opening pressure of the entire valve safety device. Therefore, the amount of the valve opening pressure of the safety valve device can be precisely determined. Further, the valve member (the safety valve device) is certainly opened by the first sealing portion of the sealing portion, so that location and direction of gas release can be specified. Additionally, in order to further introduce the gas released from the safety valve device to the outside, a release path or the like can be easily and appropriately designed.

In the above mentioned secondary battery, preferably, the sealing portion of the valve member includes the first sealing portion and the second sealing portion, the pressing portion of the holding member includes a first pressing portion pressing the first sealing portion and a second pressing portion pressing the second sealing portion, and the elastic deformable portion of the holding member includes: a first elastic deformable portion urging the first pressing portion toward the first sealing portion, the first elastic deformable portion having a first spring property that causes the first pressing portion to generate a pressing force at a level capable of separating the first sealing portion from the sealed surface of the battery case when the inner pressure in the battery case exceeds the predetermined value; and a second elastic deformable portion urging the second pressing portion toward the second sealing portion, the second elastic deformable portion having a second spring property that is different from the first spring property and causes the second pressing portion to generate a pressing force at a level capable of separating the second sealing portion from the sealed surface of the battery case later than the first sealing portion or holding the second sealing portion in contact with the sealed surface of the battery case when the inner pressure in the battery case exceeds the predetermined value.

In the secondary battery, the first spring property of the first elastic deformable portion is arranged to be different from the second spring property of the second elastic deformable portion, so that the first sealing portion opens the valve member earlier than the second sealing portion when the inner pressure in the battery case exceeds the predetermined value. Thereby, the amount of the valve opening pressure can be easily determined.

The first spring property and the second spring property may include, for example, an elastic constant, deformable range, characteristics that is expressed by the restoring-force-versus-deformable-amount relation, and others of the first and second elastic deformable portions. Specifically, different materials, shapes, or sizes may be applied to the elastic deformable portions, thereby each spring property can be made different from each other.

In the above mentioned secondary battery, preferably, the pressing portion includes the first pressing portion to press the first sealing portion and the second pressing portion to press the second sealing portion respectively, and the elastic deformable portion comprises a first leg portion having a leg-like shape extending from the first pressing portion to the fixing portion to urge the first pressing portion toward the first sealing portion and a second leg portion having the leg-like shape extending from the second pressing portion to the fixing portion to urge the second pressing portion toward the second sealing portion, respectively.

The secondary battery of the present invention includes the first leg portion having the leg-like shape extending from the first pressing portion to the fixing portion and the second leg portion having the leg-like shape extending from the second pressing portion to the fixing portion. In this way, the first leg portion urging the first pressing portion and the second leg portion urging the second pressing portion are separated from each other, so that the pressing force pressing each of the first and second pressing portions can be individualized and easily adjusted.

In the above mentioned secondary battery, preferably, the first leg portion is a low elastic leg portion with a relatively low elastic constant, and the second leg portion is a high elastic leg portion with an elastic constant relatively higher than the low elastic leg portion.

The secondary battery of the present invention comprises the first leg portion as the low elastic leg portion and the second leg portion as the high elastic leg portion. This makes it possible to allow the first sealing portion pressed by the first pressing portion urged by the low elastic leg portion to behave differently from the second sealing portion pressed by the second pressing portion urged by the high elastic leg portion.

Material for the low elastic leg portion may be a relatively soft material of which the part from the fixing portion to the first pressing portion has a relatively lower elastic constant than the elastic constant of the high elastic leg portion. For example, in a case where both the leg portions are made of the same material, a sectional area (size, thickness, or width) of the low elastic leg portion may be designed smaller than that of the high elastic leg portion. Alternatively, a length of the low elastic leg portion may be designed longer than that of the high elastic leg portion.

In the above mentioned secondary battery, preferably, the holding member is made in an integral form.

In the secondary battery of the present invention, the holding member is provided in an integral form. In other words, the pressing portion, the fixing portion, and the elastic deformable portion are integrated to constitute the single holding member. Consequently, compared to the safety valve device requiring a spring member as shown in FIG. 2 of WO2006/004143, the secondary battery can have a simpler structure with less number of components.

There are several ways to provide the holding member in an integral form such as press molding, casting, forging, injection molding, compression molding, blow molding, and vacuum molding. Moreover, as a material for the holding member, metal, resin such as plastics, and a mixture of them (for example, a mixture of metal powder and a resin) may be applied.

Further, in the above mentioned secondary battery, preferably, the power generating element includes an active material made of a hydrogen absorbing alloy, the valve member includes a space wall portion defining a valve inner space communicated with the battery case through the gas release hole, and the space wall portion includes at least partially a hydrogen permeating portion made of a material permeable to hydrogen gas to allow the hydrogen gas to pass through the space wall portion between the valve inner space and the outside the space wall portion.

In the secondary battery of the present invention, the valve member includes the hydrogen permeating portion where hydrogen gas permeates or passes through. Therefore, the secondary battery can comprise the safety valve device with simple structure while the safety valve device can also have a hydrogen leaking function for releasing hydrogen gas out of the battery case.

As a material for the space wall portion which allows hydrogen gas to permeate or pass therethrough, rubber and resin may be applied, and such the material preferably has resistance against an electrolyte of the secondary battery. Specifically, in the case of a nickel-metal hydride secondary battery, EPDM (ethylene-propylene rubber) or fluoro-resin being resistible against an alkaline electrolyte, i.e., having high alkaline resistance, is preferable.

The present invention is not limited to the above embodiment(s) and may be embodied in other specific forms without departing from the essential characteristics thereof.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A secondary battery comprising:
   a power generating element;
   a battery case storing the power generating element and including a gas release hole; and
   a safety valve device configured to close the gas release hole and release gas out of the battery case through the gas release hole when inner pressure in the battery case exceeds a predetermined value,
   wherein the safety valve device comprises:
      a valve member closing the gas release hole; and
      a holding member holding the valve member on the battery case,
   the valve member includes a sealing portion separably making contact with a sealed surface located around the gas release hole of an outer surface of the battery case, and
   the holding member is fixed to the battery case and elastically presses the sealing portion by its elastic deformation,
   wherein the holding member includes:
      a fixing portion fixed to the outer surface of the battery case;
      a pressing portion elastically pressing the sealing portion of the valve member toward the sealed surface of the battery case; and
      an elastic deformable portion being interposed between the fixing portion and the pressing portion and elastically urging the pressing portion toward the sealed surface of the battery case by elastic deformation of the elastic deformable portion itself.

2. The secondary battery according to claim 1, wherein the sealing portion of the valve member includes:
   a first sealing portion to be separated from the sealed surface of the battery case when the inner pressure in the battery case exceeds the predetermined value; and
   a second sealing portion to remain in contact with the sealed surface of the battery case or to be separated from the sealed surface of the battery case later than the first sealing portion when the inner pressure in the battery case exceeds the predetermined value.

3. The secondary battery according to claim 2, wherein the pressing portion includes:
   a first pressing portion pressing the first sealing portion; and
   a second pressing portion pressing the second sealing portion, and the elastic deformable portion includes:
   a first leg portion having a leg-like shape extending from the first pressing portion to the fixing portion to urge the first pressing portion toward the first sealing portion; and
   a second leg portion having a leg-like shape extending from the second pressing portion to the fixing portion to urge the second pressing portion toward the second sealing portion.

4. The secondary battery according to claim 3, wherein
   the first leg portion is a low elastic leg portion with a relatively low elastic constant, and
   the second leg portion is a high elastic leg portion with a relatively higher elastic constant than that of the low elastic leg portion.

5. The secondary battery according to claim 1, wherein the holding member is made in an integral form.

6. The secondary battery according to claim 1, wherein
   the power generating element includes an active material made of a hydrogen absorbing alloy,
   the valve member includes a space wall portion defining a valve inner space communicated with the battery case through the gas release hole, and
   the space wall portion includes at least partially a hydrogen permeating portion made of a material permeable to hydrogen gas to allow the hydrogen gas to pass through the space wall portion between the valve inner space and the outside the space wall portion.

7. The secondary battery according to claim 2, wherein the holding member is made in an integral form.

8. The secondary battery according to claim 3, wherein the holding member is made in an integral form.

9. The secondary battery according to claim 4, wherein the holding member is made in an integral form.

10. The secondary battery according to claim 2, wherein
    the power generating element includes an active material made of a hydrogen absorbing alloy,
    the valve member includes a space wall portion defining a valve inner space communicated with the battery case through the gas release hole, and
    the space wall portion includes at least partially a hydrogen permeating portion made of a material permeable to hydrogen gas to allow the hydrogen gas to pass through the space wall portion between the valve inner space and the outside of the space wall portion.

11. The secondary battery according to claim 3, wherein the power generating element includes an active material made of a hydrogen absorbing alloy, the valve member includes a space wall portion defining a valve inner space communicated with the battery case through the gas release hole, and the space wall portion includes at least partially a hydrogen permeating portion made of a material permeable to hydrogen gas to allow the hydrogen gas to pass through the space wall portion between the valve inner space and the outside of the space wall portion.

12. The secondary battery according to claim 4, wherein the power generating element includes an active material made of a hydrogen absorbing alloy, the valve member includes a space wall portion defining a valve inner space communicated with the battery case through the gas release hole, and the space wall portion includes at least partially a hydrogen permeating portion made of a material permeable to hydrogen gas to allow the hydrogen gas to pass through the space wall portion between the valve inner space and the outside of the space wall portion.

\* \* \* \* \*